United States Patent
Dutkiewicz et al.

(10) Patent No.: US 12,291,413 B2
(45) Date of Patent: May 6, 2025

(54) AUTOMATIC BULK MATERIAL DISPENSING SYSTEM

(71) Applicant: SIGNIFI SOLUTIONS INC., Mississauga (CA)

(72) Inventors: Kris Dutkiewicz, Barrie (CA); Richard Longo, Bradford (CA); Yong Suk Jin, Oakville (CA); Shamira Jaffer, Mississauaga (CA)

(73) Assignee: SIGNIFI SOLUTIONS INC., Mississauga (CA)

( * ) Notice: Subject to any disclaimer, the term of this patent is extended or adjusted under 35 U.S.C. 154(b) by 178 days.

(21) Appl. No.: 18/082,409

(22) Filed: Dec. 15, 2022

(65) Prior Publication Data
US 2023/0192424 A1    Jun. 22, 2023

Related U.S. Application Data

(60) Provisional application No. 63/290,890, filed on Dec. 17, 2021.

(51) Int. Cl.
*B65G 65/46*    (2006.01)
*B65G 43/08*    (2006.01)
(Continued)

(52) U.S. Cl.
CPC ............. *B65G 65/46* (2013.01); *B65G 43/08* (2013.01); *G07F 13/02* (2013.01); *G07F 13/04* (2013.01);
(Continued)

(58) Field of Classification Search
CPC ................. B65G 33/14; B65G 33/16
(Continued)

(56) References Cited

U.S. PATENT DOCUMENTS

| | | | | |
|---|---|---|---|---|
| 966,833 | A | * | 8/1910 | Heyser .................... B05B 15/25 222/404 |
| 3,949,863 | A | * | 4/1976 | Lippi ..................... B65G 33/24 198/666 |

(Continued)

FOREIGN PATENT DOCUMENTS

| EP | 0846634 A1 | 6/1998 |
|---|---|---|
| EP | 1661824 A2 | 5/2006 |

(Continued)

OTHER PUBLICATIONS

CFAM Food, "CFAM Food-ATM—What is a Food-ATM?", food-atm.com, date unknown, Retrieved from the Internet on Apr. 11, 2023 from URL: http://www.food-atm.com/food-atms.html.

*Primary Examiner* — Paul R Durand
*Assistant Examiner* — Michael J. Melaragno
(74) *Attorney, Agent, or Firm* — Perry + Currier Inc.

(57) ABSTRACT

An example bulk material dispensing apparatus includes: a frame; a hopper supported in the frame, the hopper configured to contain a bulk material for dispensing by the dispensing apparatus and having a hopper outlet; a feeding unit interconnected with the hopper outlet, the feeding unit configured to receive the bulk material from the hopper outlet and comprising: a feeding tube; and an auger disposed in the feeding tube, the auger configured to rotate to drive the bulk material received from the hopper outlet to be dispensed from a dispensing outlet; and a controller interconnected with the auger, the controller configured to: receive a dispensing request specifying a quantity of bulk material to dispense; and control the auger to rotate to dispense the quantity of bulk material.

22 Claims, 7 Drawing Sheets

(51) Int. Cl.
*G07F 13/02* (2006.01)
*G07F 13/04* (2006.01)

(52) U.S. Cl.
CPC .. *B65G 2201/04* (2013.01); *B65G 2203/0241* (2013.01); *B65G 2203/0258* (2013.01); *B65G 2203/042* (2013.01)

(58) Field of Classification Search
USPC .......................................................... 222/142
See application file for complete search history.

(56) References Cited

U.S. PATENT DOCUMENTS

| | | | | |
|---|---|---|---|---|
| 4,015,366 | A * | 4/1977 | Hall, III | A01G 3/04 |
| | | | | 193/25 E |
| 4,032,048 | A * | 6/1977 | Nichols | B65D 90/623 |
| | | | | 222/556 |
| 4,074,832 | A * | 2/1978 | McCarthy | B65D 88/66 |
| | | | | 222/245 |
| 4,169,419 | A * | 10/1979 | Burgess | A01C 15/001 |
| | | | | 111/80 |
| 6,601,463 | B2 * | 8/2003 | Paslay | G07D 9/008 |
| | | | | 73/149 |
| 6,986,294 | B2 * | 1/2006 | Fromme | G01F 23/284 |
| | | | | 73/866 |
| 8,581,734 | B2 * | 11/2013 | Ozamiz | B65D 90/48 |
| | | | | 340/613 |
| 9,683,955 | B2 * | 6/2017 | Bloemendaal | G01N 27/223 |
| 9,903,746 | B2 * | 2/2018 | Rusch | G01F 11/24 |
| 10,488,245 | B2 * | 11/2019 | Gelada Camps | G01F 23/292 |
| 10,782,069 | B2 * | 9/2020 | Bloemendaal | F26B 9/063 |
| 11,189,153 | B1 * | 11/2021 | Faszold | G08B 21/182 |
| 2005/0080567 | A1 * | 4/2005 | Wieting | F26B 21/06 |
| | | | | 702/2 |
| 2005/0284381 | A1 * | 12/2005 | Bell | A01K 5/0283 |
| | | | | 119/51.02 |
| 2014/0267705 | A1 * | 9/2014 | Hankins | A01K 5/02 |
| | | | | 119/51.01 |
| 2015/0084777 | A1 * | 3/2015 | Haber | G01F 23/292 |
| | | | | 340/635 |
| 2018/0128667 | A1 * | 5/2018 | Loftin | G01F 23/22 |
| 2019/0130693 | A1 * | 5/2019 | Spiller | G07F 13/06 |
| 2021/0108377 | A1 * | 4/2021 | Dillingham | E01C 19/174 |
| 2023/0192424 | A1 * | 6/2023 | Dutkiewicz | G07F 13/02 |
| | | | | 222/412 |

FOREIGN PATENT DOCUMENTS

| | | | | |
|---|---|---|---|---|
| GB | 2489703 A | * | 10/2012 | ............ G01F 1/007 |
| WO | WO-9850765 A1 | * | 11/1998 | ............ G01F 13/005 |
| WO | WO-2012027364 A2 | * | 3/2012 | ............ A01K 5/0258 |
| WO | WO-2018006176 A1 | * | 1/2018 | ............ F26B 21/12 |

* cited by examiner

AUTOMATIC BULK MATERIAL DISPENSING SYSTEM

FIELD OF (THE) INVENTION

The specification relates generally to bulk material systems, and more particularly to a bulk material dispensing apparatus.

BACKGROUND OF (THE) INVENTION

Common examples of bulk materials include industrial materials such as minerals, coal, ores, and chemicals as well as food items such as salt, sugar, flour and grains. However, bulk material dispensing systems which lack proper storage systems may cause food items to be lost, mishandled or wasted.

SUMMARY OF THE INVENTION

According to an aspect of the present specification an example dispensing apparatus includes: a frame; a hopper supported in the frame, the hopper configured to contain a bulk material for dispensing by the dispensing apparatus and having a hopper outlet; a feeding unit interconnected with the hopper outlet, the feeding unit configured to receive the bulk material from the hopper outlet and comprising: a feeding tube; and an auger disposed in the feeding tube, the auger configured to rotate to drive the bulk material received from the hopper outlet to be dispensed from a dispensing outlet; and a controller interconnected with the auger, the controller configured to: receive a dispensing request specifying a quantity of bulk material to dispense; and control the auger to rotate to dispense the quantity of bulk material.

According to another aspect of the present specification, an example method includes: receiving a dispensing request specifying a quantity of the bulk material to dispense; computing auger control parameters based on the quantity, a pitch of an auger of a feeding unit of the dispensing apparatus, and parameters of the bulk material; and rotating the auger according to the auger control parameters to drive the bulk material through the feeding unit to dispense the quantity of the bulk material.

BRIEF DESCRIPTION OF DRAWINGS

Implementations are described with reference to the following figures, in which.

DETAILED DESCRIPTION

Bulk material dispensing systems may be used for retailers to automatically dispense food items. However, such systems are not suitable for large-scale operations. Some public organizations may intend to use bulk material dispensing systems at various locations such as disaster areas and refugee camps. Such bulk material dispensing apparatuses or systems may need to dispense the right proportion of food to the right people safely and efficiently. Further, storage solutions in such regions are important as lack of proper storage may cause disease and sickness, exacerbating already difficult situations in refugee camps or the like.

Figure 1:
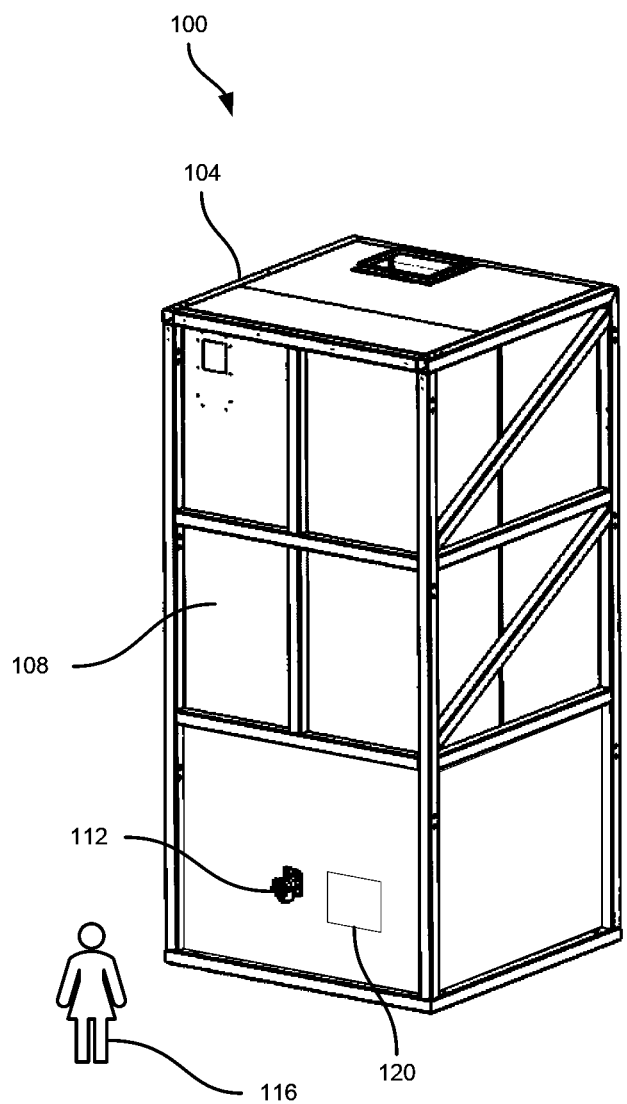
FIG. 1 depicts an example bulk material dispensing apparatus.

FIG. 1 depicts a bulk material dispensing apparatus 100 for dispensing bulk materials, in accordance with the present disclosure. The bulk material dispensing apparatus 100 (also referred to herein as the dispensing apparatus 100 or simply the apparatus 100) includes a frame 104, a hopper 108 and a dispensing outlet 112.

The frame 104 is generally configured to define outer limits of the dispensing apparatus 100 and may support components of the apparatus 100, as will be further described herein. The frame 104 may be made of wood, metals, hard plastics, combinations thereof, and the like.

The hopper 108 is supported within the frame 104 and is generally configured to contain a bulk material for dispensing by the dispensing apparatus 100. For example, the hopper 108 may contain bulk materials such as, but not limited to, dry foods, such as salts, grains including rice, sorghum, beans, flour, and the like, as well as liquid foods, such as various oils. The hopper 108 is further configured to allow the bulk material contained therein to be dispensed from the dispensing apparatus 100 via the dispensing outlet 112, as will be described in greater detail below.

The dispensing outlet 112 is configured to dispense the bulk material, for example to a user 116. Preferably, the apparatus 100 may include a control mechanism disposed at the dispensing outlet 112 to control the amount of bulk material dispensed.

In some examples, the apparatus 100 may further include an interface 120 to allow the user 116 to make a dispensing request. For example, the dispensing request may specify a quantity of the bulk material to be dispensed. The dispensing request may additionally specify a user identifier of the user 116, payment information, and other relevant parameters for dispensing the bulk material. The interface 120 may include input devices, such as touchscreens, buttons, microphones, identification sensors (e.g., fingerprint and/or other biometric sensors, image sensors, etc.), and the like, as well as output devices, such as display screens, speakers, and the like, to allow users 116 to interact with the interface 120. For example, output devices may additionally include notification lights to identify various statuses (e.g., processing the dispensing request, ready to fill the dispensing request, error condition, etc.) for the user 116.

The interface 120 may include other suitable devices for identifying users 116, determining credit and/or account details, ID card and/or badge detection, near field communication (NFC) interfaces, QR code recognition, and the like. The interface 120 may additionally include features such as sunlight-readable and durable displays, coatings to reduce contamination, screen plates to protect the display from breakage or fire, and the like.

Figure 2:
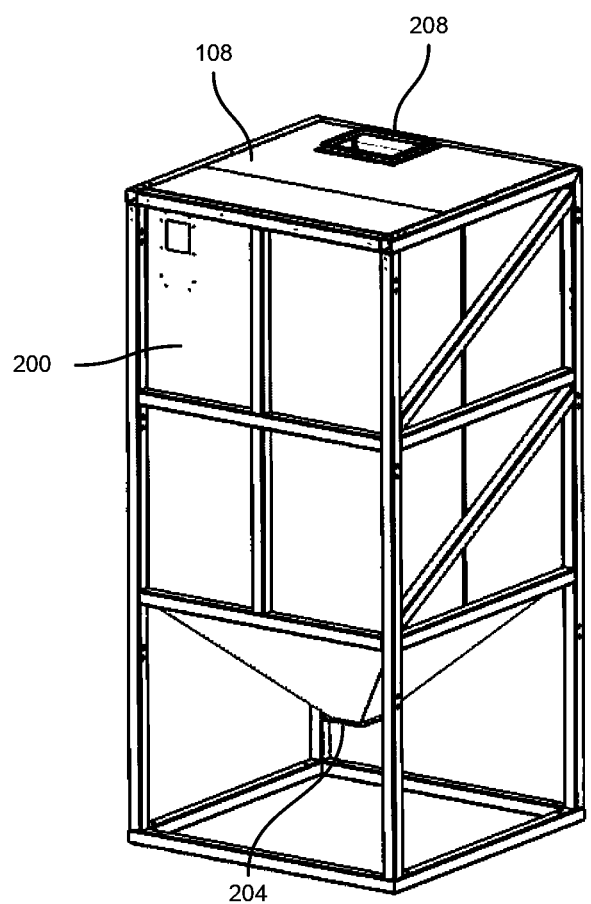
FIG. 2 depicts an example hopper of the dispensing apparatus of FIG. 1.

FIG. 2 depicts the hopper 108 in greater detail. The hopper 108 includes a body 200 and a hopper outlet 204.

The body 200 of the hopper 108 may be suitably sized and shaped to contain the bulk material. In the present example, the body 200 may be substantially rectangular, while in other examples, the body 200 may be substantially cylindrical. Preferably, the body 200 may be shaped to optimize material flow to the hopper outlet 204 and to reduce dead zones where the bulk material may build up and spoil. For example, the body 200 may include substantially no flat or horizontal regions The body 200 may be made of metals, plastics, or other suitable materials. For example, the body 200 may be formed of welded stainless steel. Further, the interior of the body 200 may include a food-grade material, such type-304 stainless steel for grains, or type-316 stainless steel for salts. Other suitable materials for the body 200 may also be selected based on the type of bulk material to be held in the body 200. For example, when the bulk material is a hygroscopic material, in particular when the bulk material is sensitive to humidity and/or moisture, the body 200 and/or accessories of the hopper 108 may be designed to reduce moisture absorbed by the bulk material. Other properties of the body 200 may be selected based on the properties of the bulk material being contained in the hopper 108. For example, the body 200 may include an interior coating to reduce build up of the bulk material against the walls of the body 200, or to facilitate cleaning.

The hopper outlet 204 is an opening allowing the bulk material to be released from the body 200. Preferably, the hopper outlet 204 may be funnel-shaped (e.g., generally conical and/or pyramidal in shape) to promote the flow of the bulk material out of the body 200.

The hopper 108 may additionally include a hopper inlet 208 to allow the bulk material to be received into the body 200. The hopper inlet 208 may include a hatch door (not shown) which may be secured with a locking mechanism to seal the hopper inlet 208. Thus, the hopper inlet 208 may be accessed only by authorized personnel, for example to fill or refill the hopper 208. The hatch door may preferably seal the hopper inlet 208 to prevent moisture, bugs, and other material from entering and contaminating the hopper 108 via the hopper inlet 208. In some examples, the hopper inlet 208 may further include a mesh structure or similar to allow the bulk material to be input into the body 200 via the hopper inlet 208 while blocking other materials (e.g., larger debris or the like). Further, the hopper inlet 208 may include blades, needles, or other suitable cutting mechanisms to cut and/or pierce a bag of bulk material to allow the bulk material to flow out of the bag and into the body 200 at the hopper inlet 208.

Figure 3:
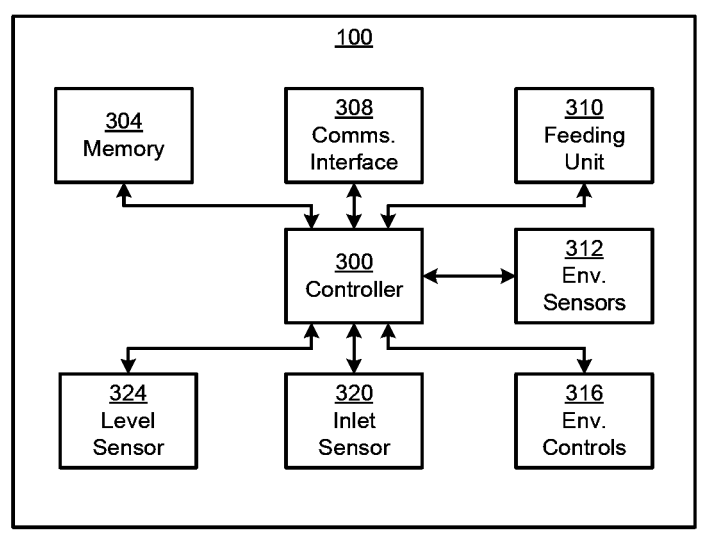
FIG. 3 depicts a block diagram of certain components of the dispensing apparatus of FIG. 1.

In some examples, the hopper 108 may include other accessories to meet and/or improve the storage requirements and/or conditions of the bulk material contained therein. For example, referring to FIG. 3, a schematic block diagram of certain components of the dispensing apparatus 100 is depicted.

The dispensing apparatus 100 includes a controller 300. The controller 300 may include any suitable processor, such as a central processing unit (CPU), a microcontroller, a microprocessor, a processing core, a field-programmable gate array (FPGA), or similar device capable of executing computer-readable instructions. The controller 300 may include multiple cooperating processors. The controller 300 may cooperate with a memory 304 storing computer readable instructions to realize the functionality described herein. The memory 304 may include any combination of volatile (e.g., Random Access Memory or RAM) and non-volatile memory (e.g., read-only memory or ROM, Electrically Erasable Programmable Read Only Memory or EEPROM, flash memory). All or some of the memory 304 may be integrated with the controller 300.

The memory 304 stores applications, each including a plurality of computer-readable instructions executable by the controller 300. The execution of the instructions by the controller 300 configures the apparatus 100 and the components of the apparatus 100 to perform the actions discussed herein. The functionality of the apparatus 100 may be implemented as a single application (e.g., a bulk material dispensing application), or a suite of distinct applications. Further, some or all of the functionality described herein may be implemented as dedicated hardware components, such as one or more FPGAs or application-specific integrated circuits (ASICs). The memory 304 additionally stores rules and data for the dispensing operation. For example, the memory 304 may store a repository tracking each dispensing request, the volume level of the bulk material in the hopper, and the like.

The dispensing apparatus 100 further includes a communications interface 308 interconnected with the controller 300. The communications interface 308 may be configured for wireless (e.g., satellite, radio frequency, Bluetooth, Wi-Fi, or other suitable communications protocols) or wired communications and may include suitable hardware (e.g., transmitters, receivers, network interface controllers, and the like) to allow the apparatus 100 to communicate with other computing devices, such as a central server configured to manage a plurality of the dispensing apparatuses 100. The specific components of the communications interface 308 are selected based on the types of communications that the apparatus 100 communicates over.

For example, the central server may be configured to manage general account and authentication databases. Accordingly, the apparatus 100 may send dispensing requests, authentication (e.g., biometric and/or other identification data for the user 116) to the central server via the communications interface 308. The apparatus 100 may similarly receive dispensing instructions to enact in response to the dispensing request from the central server via the communications interface 308.

The controller 300 is further interconnected with the interface 120 to receive input from the interface 120 and provide output for the user 116 at the interface 120. In particular, the user 116 may use the interface 120 to submit a dispensing request, including a volume of the bulk material to be dispensed. The controller 300 may process the dispensing request and control the apparatus 100 to satisfy the dispensing request.

In particular, apparatus 100 may further include a feeding unit 310 connecting the hopper 108 to the dispensing outlet 112. The feeding unit 310 is generally configured to receive bulk material from the hopper 108 (i.e., via the hopper outlet 204) and transfer the bulk material to the dispensing outlet 112. Preferably, the feeding unit 310 may be a volumetric feeder configured to dispense a precise volume of the bulk material (i.e., the volume of the bulk material specified in the dispensing request).

Figure 4:
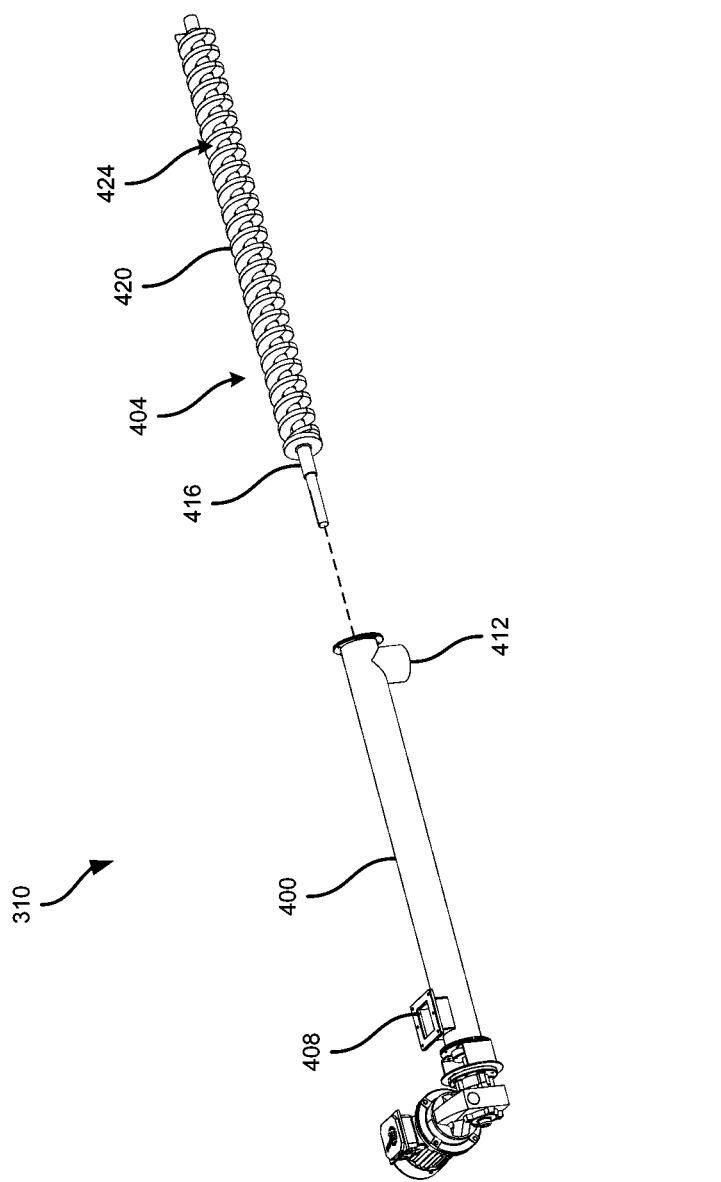
FIG. 4 depicts an exploded view of a feeding unit in the dispensing apparatus of FIG. 1.

For example, referring to FIG. 4, an exploded view of the feeding unit 310 according to an example is depicted. The feeding unit 310 includes a feeding tube 400 and an auger 404 disposed in the feeding tube 400.

The feeding tube 400 is an elongated conduit which connects the hopper outlet 208, for example, via a tube inlet 408, and the dispensing outlet 112, for example via a tube outlet 412. That is, bulk material from the hopper 108 passes out of the hopper at the hopper outlet 208, into the tube inlet 408, and is transferred through the feeding tube 400 out the tube outlet 412 and the dispensing outlet 112.

In some examples, the feeding tube 400 and/or the dispensing outlet 112 may include a sanitation unit, for example by applying ultraviolet (UV) radiation. For example, a UV sanitation unit may be made in a fully integrated aluminum package to allow for tamper-resistant installation. The UV sanitation unit may include a plurality of UV sanitation light emitting diodes (LEDs) operating in the range of 275 nm to 280 nm for the purpose of deactivating viruses and other pathogens. The UV sanitation unit can optionally be programmed and controlled by the controller 300 for varying duration, wavelength, or intensity profiles. The UV sanitation unit can optionally receive downloaded duration, wavelength or intensity profiles through a wireless connection (e.g., via the communications interface 308 and the controller 300 or via its own dedicated communications and control systems).

In order to effect the transfer of the bulk material through the feeding tube 400 and to control the volume of the bulk material dispensed at the dispensing outlet 112, the auger 404 is disposed in the feeding tube 400. The auger 404 and the feeding tube 400 may be made of stainless steel, plastic, or other suitable materials, and in particular, food-grade materials, when the bulk material is a food item. The auger 404 includes a central shaft 416 and a helical bit 420 extending from the central shaft 416 and defining a helix formation 424 in the empty space therebetween. Preferably, the auger 404 has a diameter (i.e., as measured cross-sectionally from the outer edges of the helical bit 420) which substantially matches the diameter of the feeding tube 400. Thus, when the auger 404 is seated within the feeding tube 400, the bulk material is moved through the helix 424 defined by the helical bit 420 in order to pass through the feeding tube 400.

Accordingly, when the auger 404 rotates about its longitudinal axis (i.e., as defined along the length of the central shaft 416), the helical bit 420 causes the bulk material to move from one end of the feeding tube 400 to the other (i.e., from the tube inlet 408 to the tube outlet 412). Further, the helical bit 420 may have a predefined pitch determining a predefined volume of the helix 424. Therefore, based on the predefined pitch and the speed at which the auger 404 rotates, the volume of bulk material moved through the auger 404 over time (e.g., rotation time) may be computed and tracked. In other examples, instead of or in addition to computing the volume of bulk material driven through the auger 404 based on the pitch, speed and rotation time of the auger 404, the volume of bulk material dispensed may be measured based on a volume level sensor (e.g., a weight sensor) of the bulk material within the hopper 108, and the auger 404 may be controlled based on the change in volume measured by the volume level sensor.

The auger 404 is interconnected with and controlled by the controller 300 to rotate the auger 404, thereby enabling volumetric dispensing of the bulk material from the hopper 108 via the feeding unit 310 and out of the dispensing outlet 112.

Figure 5:
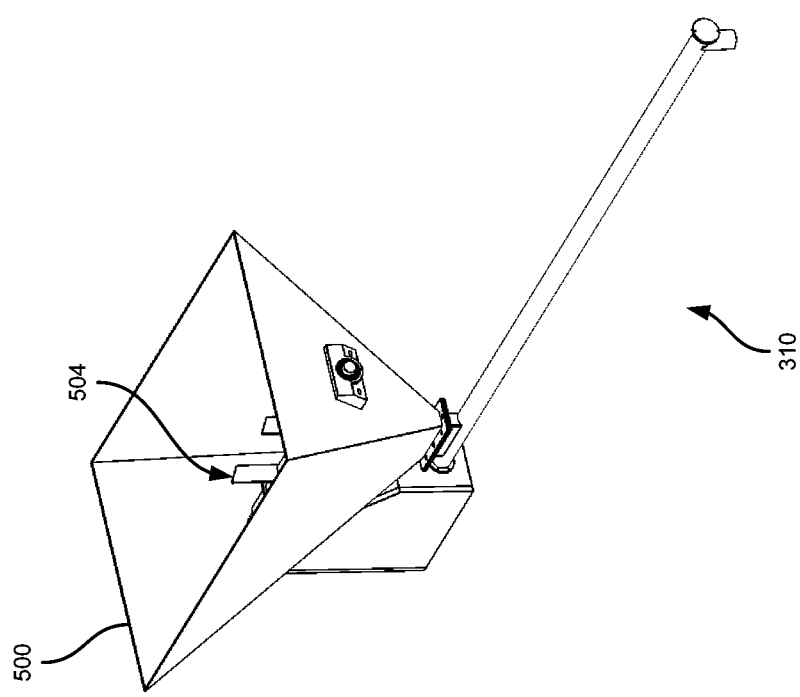
FIG. 5 depicts the feeding unit of FIG. 4 with an example feeding funnel and agitator.

Referring now to FIG. 5, in some examples, the feeding unit 310 may additionally include a feeding funnel 500 configured to connect the hopper outlet 204 with the tube inlet 408 to direct bulk material from the hopper outlet 204 into the feeding unit 310. The feeding funnel 500 may be integrally or separately formed from the hopper outlet 204.

The feeding funnel 500 may include an agitator 504 disposed therein. In the present example, the agitator 504 includes a shaft with blades extending from the shaft. In other examples, other suitable shapes of agitators are also contemplated. The agitator is configured to agitate the bulk material, for example by vibrating, rotating, or similar, as the bulk material is received from the hopper 108 into the feeding unit 310 to facilitate the flow of the bulk material, including breaking up portions of the bulk material which may have become compressed and consolidated into chunks.

The agitator 504 may also be interconnected with and controlled by the controller 300. In some examples, the controller 300 may actuate the agitator 504 substantially simultaneously as the auger 404 rotates. The flow of the bulk material from the hopper 108 into the feeding tube 400 may be facilitated by the agitation of the agitator 504, and allowing the feeding tube 400 to be refilled as the auger 404 dispenses the bulk material from the feeding tube 400.

In still further examples, the apparatus 100 may include other transferring tools, such as screw conveyors, conveyor belts, vertical lifters, and the like to transfer the bulk material within or around the apparatus 100.

Returning to FIG. 3, in some examples, the apparatus 100 may additionally include various other features to improve the storage and dispensing operations of the apparatus 100. For example, the apparatus 100 may include one or more environmental sensors 312 to detect environmental parameters, such as temperature, humidity, light, or another relevant parameter of the environment of the interior of the hopper 108. Thus, the environmental sensors 312 may include temperature sensors, humidity sensors, light sensors, and the like. The environmental sensors 312 may be suitably disposed in or around the hopper 108 (e.g., in the body 200, at the hopper outlet 204 or the hopper inlet 208, or the like).

The apparatus 100 may also include one or more environmental control systems 316 corresponding to the environmental sensors 312 to control the corresponding environmental parameter. For example, the environmental control systems 316 may include, but are not limited to, air conditioners and/or heaters to control the temperature of the hopper 108, humidifiers and/or dehumidifiers to control the humidity of the hopper 108, and the like. The environmental control systems 316 are also suitably disposed in or around the hopper 108. In some examples, the hopper 108 may include a storage region external to the body 200 to store accessories for the hopper, such as the environmental control systems 316. In such examples, the body 200 may include suitable apertures or other regions for application of the environmental control systems 316 to control the corresponding environmental parameter.

The environmental sensors 312 and the environmental control systems 316 are interconnected with the controller 300 which may receive detected environmental parameters from the environmental sensors 312, compare the detected parameters to predefined threshold parameters, and control the corresponding environmental control systems 316 to adjust the environmental parameter to meet the predefined threshold parameters. The frame 104 may include mounting plates and posts to allow the hopper accessories to be securely mounted and/or stored in the storage region of the hopper 108.

The apparatus 100 may additionally include a hopper inlet sensor 320 located at the hopper inlet 208. In particular, the hopper inlet sensor 320 may detect a state of the hatch door securing the hopper inlet 208. This may include detecting when the hatch door is open, when it is closed, and when it has not been properly closed (e.g., if it becomes jammed by debris and is allowing air to flow into the body 200). Preferably, the hatch door may be lockable, and the hopper inlet sensor 320 may additionally detect a locking state of the hatch door. The hopper inlet sensor 320 is also interconnected with the controller 300 to allow the controller 300 to process the state detected by the hopper inlet sensor 320 and alert an operator of any issues with the hatch door. For example, the controller 300 may determine whether an open state of the hatch door corresponds with an authorized access code input to open the hatch door, or if the open state is unauthorized. Additionally, the controller 300 may send alerts or notifications (i.e., via the communications interface 308) upon identifying an unauthorized access or upon identifying that the hatch door is not properly closed (e.g., an error state).

The apparatus 100 may further include a volume level sensor 324 configured to measure a level or volume of the bulk material in the body 200. For example, the volume level sensor 324 may be an ultrasonic sensor, an image and/or depth sensor, a weight sensor, or other suitable sensor capable of detecting a measurement indicative of the amount of bulk material in the body 200. In some examples, multiple volume sensors 324 may be employed for a graduated detection approach. The volume level sensor 324 is interconnected with the controller 300 to allow the controller 300 to process the volume level detected by the sensor 324 and alert an operator of if/when a threshold volume level is no longer met (e.g., when the hopper 108 may need to be refilled).

Other accessories and/or features of the apparatus 100 are also contemplated. For example, the apparatus 100 may include an oil and/or other liquid dispenser including a bulk pump for rapidly filling from an oil and/or liquid container or a metered pump to accurately fill a liquid volume from the oil and/or liquid container. The oil dispenser may include food-rated plastic containers hooked up in parallel with food-grade sealed piping. The apparatus 100, and in particular the oil dispenser, can be flushed with cleaning solution for deep cleaning at maintenance. An enclosure of the oil dispenser may be designed to reduce dust, weather, and bug ingress.

In still further examples, the apparatus 100 may be configured to dispense packages, for example to provide refugees in refugee camps with items such as nutrition tablets, medical tablets, sachets and the like. The dispensing mechanism may additionally include a measuring unit for counting accuracy.

Figure 6:
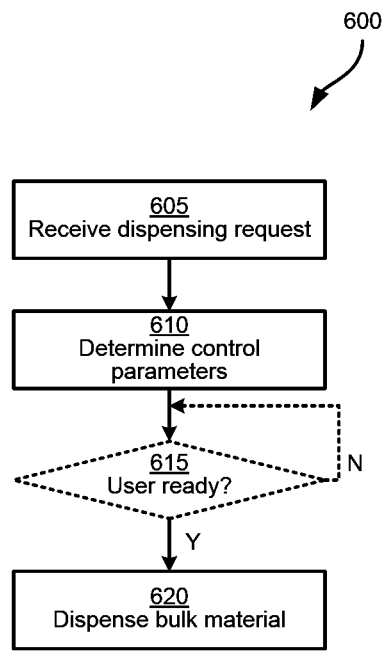
FIG. 6 depicts a flowchart of an example method of dispensing a bulk material.

Turning now to FIG. 6, the functionality implemented by the apparatus 100 will be discussed in greater detail. FIG. 6 illustrates a method 600 of dispensing a bulk material. The method 600 will be discussed in conjunction with its performance by the apparatus 100. In other examples, the method 600 may be performed by other suitable devices or systems.

At block 605, the apparatus 100 receives a dispensing request specifying a quantity of the bulk material to dispense. For example, the dispensing request may be received at the interface 120. The dispensing request may additionally include identification or authentication information, for example from the user 116 tapping an ID card, detecting biometric information, and the like. Further, in some examples the dispensing request may additionally include payment information, for example as received from a payment terminal of the interface 120.

In some examples, the controller 300 may process the dispensing request including the identification and payment information. In particular, the controller 300 may determine whether the dispensing request is valid based on the identification and payment information, for example if the user is permitted to obtain the bulk material and/or the requested quantity of the bulk material, if the account and/or payment information includes sufficient credit to dispense the requested quantity of bulk material, and the like. In other examples, the apparatus 100 may send the dispensing request to a central server via the communications interface 308 and the server may perform the determination of the validity of the dispensing request.

At block 610, in response to the dispensing request, and if applicable, in response to determining that the dispensing request is valid, the controller 300 computes auger control parameters. In particular, the auger control parameters are computed based on the quantity specified in the dispensing request (or a determined permitted amount based on the dispensing request), the pitch of the auger 404, and various parameters (e.g., weight, size, etc.) of the bulk material itself.

In some examples, after computing the auger control parameters, at block 615, the apparatus 100 may provide an output (e.g., a visual notification via a flashing light, printed text, an audible alert, or the like) indicating that the apparatus 100 is ready to fulfil the dispensing request. The apparatus 100 may then wait for a subsequent response from the user 116 that the user 116 is prepared to receive the bulk material from the dispensing outlet 112. For example, the user 116 may use the interface 120 to provide a ready indication. In other examples, the interface 120 may have a button and/or other actuator for the user 116 to continuously engage to dispense the bulk material from the dispensing outlet 112.

At block 620, the controller 300 controls the auger 404 in accordance with the computed auger control parameters to dispense the quantity of the bulk material. In particular, the controller 300 rotates the auger 404 at a specified speed and by a specified number of rotations defined by the auger control parameters computed at block 610. The control of the auger 404 by the auger control parameters causes the specified quantity of the bulk material to be dispensed at the dispensing outlet. In some examples, the controller 300 may perform block 620 upon detecting that the button and/or actuator is being engaged, and may stop rotation of the auger 404 when the specified quantity has been dispensed.

In other examples, such as if the dispensed volume is computed based on detected changes in volume in the hopper 108 based on the volume level sensor 324, blocks 615 and 620 may be performed substantially simultaneously. That is, the auger control parameters may include be a predefined and/or otherwise selected speed at which to rotate the auger 404 for a practical dispensing speed and estimated time (e.g., to allow the user 116 to be able to receive the bulk material in a reasonable amount of time while not overloading the quantity of the bulk material dispensed at once). The amount of time for which to rotate the auger 404 may be controlled based on the volume level detected by the volume level sensor 324. For example, if the volume level sensor 324 is a weight sensor, the volume level sensor 324 may log an initial weight, and the controller 300 may rotate the auger 404 until the volume level sensor 324 records a final weight, wherein the difference between the initial weight and the final weight corresponds to the requested volume of the bulk material (i.e., as computed based on the density of the bulk material). That is, the controller 300 may control the auger 404 to rotate until the volume level sensor 324 detects that the volume of the bulk material in the hopper 108 has decreased by the quantity specified in the dispensing request.

In some examples, simultaneously with controlling the auger 404, the controller 300 may additionally control the agitator 504 to facilitate continued flow of the bulk material into the feeding unit 310 from the hopper 108.

As described above, a bulk material dispensing apparatus may facilitate dispensing bulk materials, including food items, in an automated and accurate fashion. In particular, the dispensing apparatus may receive a dispensing request and use a volumetric feeder including an auger to dispense the specified quantity of bulk material. Further, the dispensing request may be verified against a database (e.g., by a central server) to ensure that appropriate amounts of the bulk material are being dispensed to the proper people. The dispensing apparatus further provides for safe and secure storage, for example for food items by providing a hopper with a securely locked hatch door, preventing unauthorized access, as well as contamination. Still further, the dispensing apparatus may include various environmental control systems to manage the environmental conditions within the hopper to optimize storage, particularly of food items.

Figure 7:
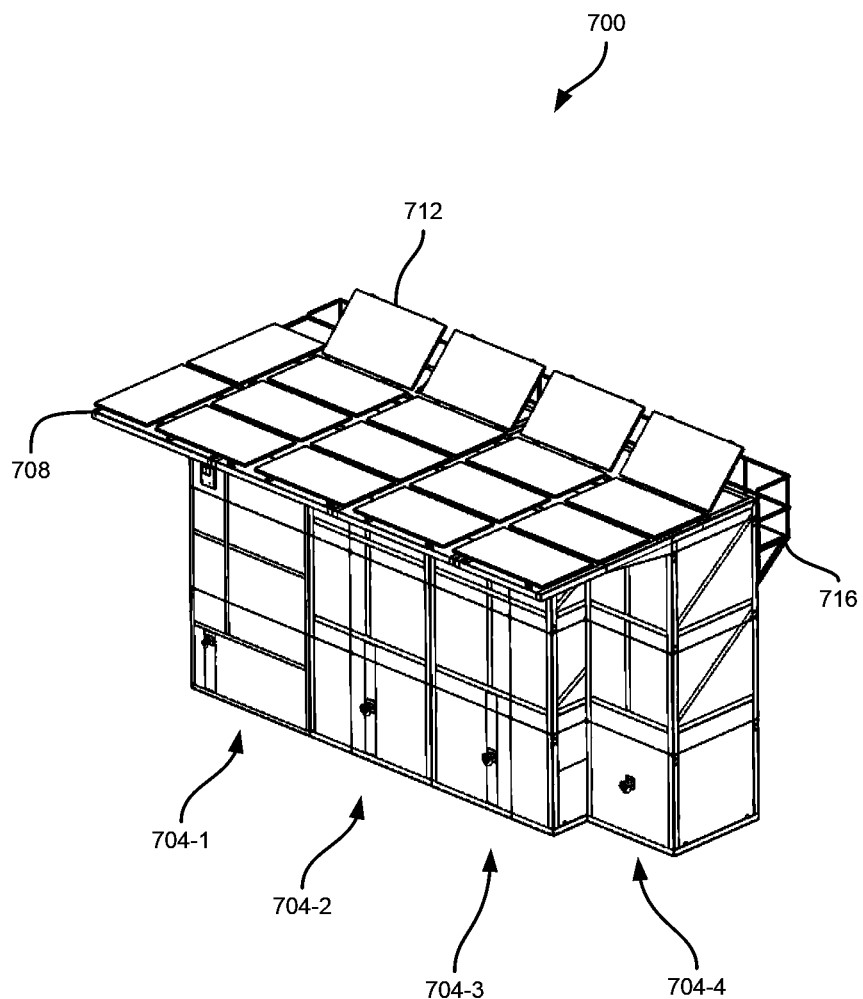
FIG. 7 depicts an example bulk material dispensing system.

As will be appreciated, the apparatus as described above may be particularly suitable for refugee camp applications. To further enhance the application of the presently described dispensing apparatus, the dispensing apparatus may be modularly joined with additional similar dispensing apparatuses, for example as depicted in FIG. 7 to form a dispensing system 700 with multiple hopper modules 704-1, 704-2, 704-3, and 704-4, each configured to dispense a different type of bulk material. That is, each of the hopper modules 704 may correspond to a dispensing apparatus 100 as described above. Further, each of the hopper modules 704 may be tailored (e.g., in the construction of the corresponding hoppers, storage areas, and the like) based on the type of bulk material contained therein.

In some examples, the dispensing system 700 may be constructed for a containerized structure configured for example to be housed in a standard sized shipping container. The containerized dispensing system 700 may reduce setup needs for field assembly or wiring of mechanical components. The elements of the dispensing system 700 may therefore be sized and shaped (e.g., foldable or similar) to fit into the shipping container. The containerized dispensing system 700 may therefore include both dry food hoppers, liquid food storage, oil containers and the like.

To still further improve the application of the dispensing system 700 in refugee camp, disaster area, and other limited resource locations, the dispensing system 700 may further include canopies 708 and solar panels 712.

The canopies 708 may generally be configured to fold out to cover dispensing areas (i.e., the regions in which users may stand to operate the dispensing system 700 for example by interacting with the user interface and/or to receive the bulk material from the dispensing outlets) and to provide shade cover to the dispensing areas.

The solar panels 712 may be installed over the canopies, the tops of the hopper modules 704, and may further be installed over the hatch doors providing access to the hoppers. Preferably, the solar panels 712 may be adjustable in angle and direction to maximize solar efficiency. Some solar panels 712 located over the hatch doors may have supporting measures such as gas springs to support the solar panels 712 independently of the hatch doors to permit access to the hoppers via the hatch doors.

In such examples, the dispensing system 700 may be solar-powered with a battery backup. The dispensing system 700 may therefore include an energy storage system to store solar electric power and provide power for use when the dispensing system 700 is isolated from the grid. The batteries may be swappable when discharged. The power system of the dispensing system 700 may further include an emergency power generator with fuels such as fuel cell stacks or diesel. The system 700 can include a battery management system to optimize power output and efficiency.

Further, the large scale construction of the dispensing system 700 may make it difficult to access the hatch doors, hence the dispensing system 700 may further include a platform 716 to allow workers to deliver the bulk material into the hopper modules 704.

The dispensing apparatus described herein may therefore be modularized to form a dispensing system suitable for large scale use and secure food storage.

The scope of the claims should not be limited by the embodiments set forth in the above examples but should be given the broadest interpretation consistent with the description as a whole.

The invention claimed is:

1. A bulk material dispensing apparatus comprising:
   a frame;
   a hopper supported in the frame, the hopper configured to contain a bulk material for dispensing by the dispensing apparatus and having a hopper outlet;
   a feeding unit interconnected with the hopper outlet, the feeding unit configured to receive the bulk material from the hopper outlet and comprising:
      a feeding tube; and
      an auger disposed in the feeding tube, the auger configured to rotate to drive the bulk material received from the hopper outlet to be dispensed from a dispensing outlet; and
   a controller interconnected with the auger, the controller configured to:
      receive a dispensing request specifying a quantity of bulk material to dispense;
      compute auger control parameters based on the quantity of bulk material, a pitch of an auger of a feeding unit of the dispensing apparatus, and parameters of the bulk material; and
      control the auger to rotate to dispense the quantity of bulk material.

2. The bulk material dispensing apparatus of claim 1, wherein the hopper outlet is funnel-shaped.

3. The bulk material dispensing apparatus of claim 1, further comprising a feeding funnel connecting the hopper outlet to the feeding unit to direct the bulk material from the hopper outlet into the feeding unit.

4. The bulk material dispensing apparatus of claim 3, further comprising an agitator disposed in the feeding funnel, the agitator configured to facilitate flow of the bulk material through the feeding funnel.

5. The bulk material dispensing apparatus of claim 4, wherein the controller is configured to actuate the agitator simultaneously with rotation of the auger.

6. The bulk material dispensing apparatus of claim 1, further comprising a hatch door configured to seal a hopper inlet of the hopper.

7. The bulk material dispensing apparatus of claim 1, further comprising:
   an environmental sensor to detect an environmental parameter of the hopper; and
   an environmental control system to adjust the environmental parameter.

8. The bulk material dispensing apparatus of claim 7, wherein the environmental parameter comprises temperature or humidity.

9. The bulk material dispensing apparatus of claim 1, further comprising a volume level sensor configured to measure a volume of the bulk material in the hopper.

10. The bulk material dispensing apparatus of claim 9, wherein the controller is configured to rotate the auger until the volume level sensor detects that the volume of the bulk material in the hopper has decreased by the quantity specified in the dispensing request.

11. The bulk material dispensing apparatus of claim 9, wherein the volume level sensor comprises a weight sensor.

12. A bulk material dispensing system comprising one or more bulk material dispensing apparatuses according to claim 1 in a modular containerized system.

13. A method of dispensing a bulk material from a dispensing apparatus, the method comprising:
receiving a dispensing request specifying a quantity of the bulk material to dispense;
computing auger control parameters based on the quantity, a pitch of an auger of a feeding unit of the dispensing apparatus, and parameters of the bulk material; and
rotating the auger according to the auger control parameters to drive the bulk material through the feeding unit to dispense the quantity of the bulk material.

14. The method of claim 13, further comprising processing the dispensing request to determine a validity of the dispensing request.

15. The method of claim 14, wherein the validity of the dispensing request is based on one or more of: user identification information, user payment information, and user account information.

16. The method of claim 13, wherein the auger control parameters comprise a specified speed at which to rotate the auger and a specified number of rotations to rotate the auger.

17. The method of claim 13, further comprising:
measuring a volume of the bulk material in a hopper containing the bulk material; and
rotating the auger until the volume of the bulk material in the hopper has decreased by the quantity specified in the dispensing request.

18. The method of claim 17, wherein measuring the volume comprises measuring a weight of the bulk material in the hopper.

19. The method of claim 13, further comprising providing an output indicating that the dispensing apparatus is ready to fulfil the dispensing request.

20. The method of claim 13, further comprising receiving a ready indication indicating that a user is ready to receive the dispensed bulk material, and wherein rotating the auger occurs in response to receiving the ready indication.

21. The method of claim 13, further comprising detecting engagement of an actuator indicating that a user is ready to receive the dispensed bulk material, and wherein rotating the auger occurs in response to continuous engagement of the actuator.

22. The method of claim 13, further comprising actuating an agitator disposed in a feeding funnel configured to feed the bulk material into the feeding unit simultaneously with rotating the auger to facilitate flow of the bulk material into the feeding unit.

* * * * *